Patented Sept. 21, 1954

2,689,790

UNITED STATES PATENT OFFICE 2,689,790

NITROGENOUS COMPOUND HERBICIDES

David T. Mowry and Arthur H. Schlesinger, Dayton, Ohio, assignors to Monsanto Chemical Company, St. Louis, Mo., a corporation of Delaware No Drawing. Application September 26, 1951, Serial No. 248,461

3 Claims. (Cl. 71—2.7)

The present invention relates to nitrogenous organic compounds of sulfur, provides certain new (alkylmercapto)ethyl-quaternary nitrogen compounds, herbicidal compositions containing the new compounds, and methods of destroying undesirable plants in which methods the herbicidal compositions are employed.

The invention provides as new and valuable compositions a series of 2-(alkylmercapto)ethyl substituted-quaternary nitrogen compounds having the general formula:

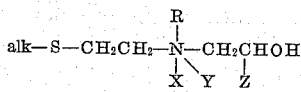

in which alk represents an alkyl radical of from 8 to 16 carbon atoms, X is selected from the class consisting of chlorine and bromine, Z is selected from the class consisting of hydrogen and the methyl radical, R is an alkyl radical of from 1 to 4 carbon atoms, and Y is selected from the class consisting of R and the radical

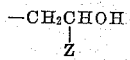

The above general formula includes, e. g. [2-(alkylmercapto)ethyl] (2-hydroxyethyl)dimethylammonium chlorides, the [2-(alkylmercapto)-ethyl] (2-hydroxyethyl)diethylammonium chlorides, the [2-(alkylmercapto)ethyl]-bis(2-hydroxyethyl)-n-propylammonium chlorides, the [2-(alkylmercapto)ethyl]bis(2-hydroxyethyl)-isobutylammonium chlorides, the [2-(alkylmercapto)ethyl] (2-hydroxypropyl)dimethylammonium bromides, the [2-(alkylmercapto)ethyl] (2-hydroxypropyl)diisopropylammonium bromides, and the [2-(alkylmercapto)ethyl]-bis(2-hydroxypropyl)methylammonium chlorides in which the alkyl radical has from 8 to 16 carbon atoms.

The present compounds are readily prepared by the addition reaction of a 2-(alkylmercapto)-ethyl chloride or bromide in which the alkyl radical has from 8 to 16 carbon atoms and an alkanolamine selected from the class consisting of (2-hydroxyethyl)dialkylamines, bis(2-hydroxyethyl)alkylamines, 2-(hydroxypropyl)dialkylamines and bis(2-hydroxypropyl)alkylamines in which the alkyl radical has from 1 to 4 carbon atoms.

2-(alkylmercapto)ethyl halides which may be used for the preparation of the present quaternary compounds are primary or branched-chain 2-(alkylmercapto)ethyl chlorides or bromides of from 8 to 16 carbon atoms, e. g., 2-(n-octylmercapto)ethyl chloride, 2-[(2-ethylhexyl)mercapto]ethyl bromide, 2-(n-nonylmercapto)ethyl chloride, 2-(n-decylmercapto)ethyl chloride, 2-(tert-dodecylmercapto)ethyl bromide, 2-(n-tridecylmercapto)ethyl chloride, 2-(n-hexadecylmercapto)ethyl chloride, etc. The alkyl radical of the 2-(alkylmercapto)ethyl halide may also be one which is derived from technical mixtures of mono-chlorinated hydrocarbons, e. g., substantially mono-chlorinated kerosene fractions, or from alkyl chlorides obtained from technical mixtures of alcohols, e. g., the mixture of alcohols obtained by hydrogenation of coconut oil fatty acids or the mixture of higher alcohols obtained by reaction of carbon monoxide with hydrogen.

Examples of alkanolamines which may be reacted with the 2-(alkylmercapto)ethyl chlorides or bromides are (2-hydroxyethyl)dimethylamine, (2-hydroxyethyl)di-n-propylamine, (2-hydroxyethyl)diisobutylamine, bis(2-hydroxyethyl)ethylamine, bis(2-hydroxyethyl)isopropylamine, bis-(2-hydroxyethyl)-n-butylamine, (2-hydroxypropyl)diethylamine, (2-hydroxypropyl)dimethylamine, bis(2-hydroxypropyl)-n-propylamine, etc.

Compounds having the above formula are readily obtainable by refluxing a mixture of the alkanolamine compound and the 2-(alkylmercapto)ethyl halide in the presence or absence of an inert diluent until the quaternary nitrogen compound has been formed. Generally, completion of the reaction may be evidenced by noting a change in the water-solubility of the reaction mixture, the quaternary products being highly water-soluble and the starting materials being generally water-insoluble. Since formation of the quaternary compounds involves addition of one mole of the halide to one mole of the amine, substantially equimolar proportions of these reactants are advantageously employed. However, an excess of either reactant may be used. An excess of the alkanolamine compound may be employed as a diluent in the reaction. Other diluents which may be used are liquids which are inert under the reaction conditions, e. g., alcohol, acetone, nitrobenzene, ether, etc.

The present quaternary nitrogen compounds are generally stable compounds which range from viscous liquids to waxy or crystalline solids. They are particularly valuable in the formulation of very efficient herbicidal compositions, as will be hereinafter disclosed, but they may also be used for a variety of other industrial and agricultural purposes, e. g., as lubricant additives, surface-active agents, chemical intermediates, etc.

The present invention is further illustrated, but not limited, by the following examples:

*Example 1*

A mixture consisting of 26.5 grams (0.1 mole)

of 2-(tert-dodecylmercapto)ethyl chloride and 10.5 grams (0.09 mole) of bis(2-hydroxyethyl)-methylamine in 50 ml. of alcohol was refluxed for about two hours. The alcohol was then removed from the resulting reaction mixture by distilling in vacuo. After washing the residue several times with ether it was oven-dried to give 28 grams (83 per cent theoretical yield) of the pale, tan solid [2-(tert-dodecylmercapto)ethyl] bis(2-hydroxyethyl)methylammonium chloride, analyzing 9.07 per cent ionic chlorine (calcd. Cl for $C_{19}H_{42}NO_2SCl$, 9.26).

*Example 2*

(2-hydroxyethyl)dimethylamine (8.9 grams, 0.1 mole) and 2-(tert-dodecylmercapto)ethyl chloride (26.5 grams, 0.10 mole) were added to 50 ml. of alcohol and the resulting mixture was refluxed for two hours. Alcohol was removed by vacuum distillation and the residue was washed once with ether, and the ether washings discarded. A second ether washing showed the quaternary salt to be somewhat ether-soluble. Hence the ether was removed by distilling in vacuo. Drying of the residual syrup in a vacuum oven gave 22 grams (62 per cent theoretical yield) of the white, waxy [2-(tert-dodecylmercapto)-ethyl] (2-hydroxyethyl)dimethylammonium chloride.

*Example 3*

Herbicidal activity of the compounds of Examples 1 and 2 as well as of isopropyl carbanilate, a standard herbicide of commercial importance, was determined by germination of cucumber and wheat seeds for four days at a temperature of 76° F. in the presence of aqueous suspensions of each of the indicated chemicals at concentrations of 100 p. p. m. Fifty seeds were used for each test. The following results are expressed as per cent length of the primary roots in the presence of the chemical compared with the length of primary roots of controls which had been germinated in pure water:

| Compound Tested | Percent Growth At 100 Parts Per Million Cucumber |
|---|---|
| Example 1 | 9 |
| Example 2 | 8 |
| Isopropyl carbanilate | 8 |

The herbicidal efficiency of the present compounds is remarkable, because, as shown in the table given below, related compounds do not generally possess great herbicidal efficiency. When tested as described above, aqueous suspensions of a random group of such compounds were found to have the following effects:

| Compound Tested | Percent Growth at 100 Parts Per Million | |
|---|---|---|
| | Cucumber | Wheat |
| 2-(tert-dodecylmercapto) ethyl]-tris (2-hydroxyethyl) ammonium chloride | 25 | 22 |
| Tetraethylammonium chloride | 109 | |
| (3,5,5-trimethylhexyl) bis (2-hydroxyethyl) methylammonium bromide | 39 | |
| [2-(tert-butylmercapto) ethyl]-pyridinium chloride | 37 | |

*Example 4*

Spray testing of the herbicidal activity of the compounds of Examples 1 and 2 as well as of the similarly prepared 2-(tert-dodecylmercapto) tris-(2-hydroxyethyl)ammonium chloride was conducted as follows:

A one per cent aqueous solution or suspension of the quaternary compound was prepared, employing 0.2 per cent of an emulsifying agent known to the trade as "Emulsifier L" and comprising a mixture of a polyethyleneglycol derivative and an alkylbenzenesulfonate.

Three-week old corn and bean plants were respectively sprayed with the solution, two plants of each variety being used for each test. The spraying was continued until droplets formed and/or fell from the foliage and stems of the sprayed plants, up to 15 ml. of the solution or suspension being applied to each plant. The sprayed plants as well as two untreated "blank" specimens of each plant were then allowed to remain in the same greenhouse for a period of one week. At the end of that time the sprayed plants were compared with the untreated plants in order to determine the extent of injury, if any. The following observations were made:

| Compound Tested | Injurious Effect on— | |
|---|---|---|
| | Bean | Corn |
| Example 1 | Severe, leaves dropped. | Moderate. |
| Example 2 | Plant dead, leaves dropped. | Plant dead, leaves dried. |
| [2-(tert-Dodecylmercapto) ethyl]-tris (2-hydroxyethyl) ammonium chloride. | Moderate | Moderate. |

Herbicidal compositions containing the present compounds may be water solutions or oil-in-water emulsions of the compounds. The solutions may be obtained simply by dissolving them in water in effective proportions. Dispersing or emulsifying agents are advantageously employed in the preparation of the herbicidal suspensions or emulsions and a wetting or penetrating agent is desirable for simple aqueous solutions. The present compounds are preferably applied by spraying aqueous solutions or oil emulsions of the same, this method affording an easy and inexpensive way of destroying plant growth.

Because of the high herbicidal activity of the present compounds they are advantageously applied by mixing them with inert ingredients as carriers. Valuable herbicidal compositions are prepared by incorporating small amounts of the compounds into such carriers as water, hydrocarbon oils, organic solvents, dusts such as bentonite, pumice, etc. Sprays may also be prepared by dissolving the chemicals in oils or organic solvents to make concentrates and then adding small amounts of the concentrates to water, advantageously in the presence of an emulsifying or dispersing agent. Emulsions and dispersions thus prepared have the property of adhering to the plant foliage for a long period of time.

What we claim is:

1. The method of destroying undesirable plants which comprises applying to said plants a toxic quantity of a herbicidal composition comprising an inert carrier, and, as the essential active ingredient a quaternary nitrogen compound having the formula:

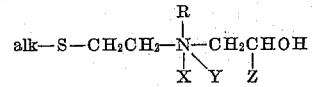

in which alk represents an alkyl radical of from 8 to 16 carbon atoms, X is selected from the class consisting of chlorine and bromine, Z is selected from the class consisting of hydrogen and the methyl radical, R is an alkyl radical of from 1 to 4 carbon atoms, and Y is selected from the class consisting of R and the radical $$-CH_2CHOH$$
$$\phantom{-CH_2CH}|$$
$$\phantom{-CH_2CHO}Z$$

2. The method of destroying undesirable plants which comprises applying to said plants a toxic quantity of a herbicidal composition comprising an inert carrier and [2-(tert-dodecylmercapto)-ethyl] bis(2 - hydroxyethyl) methylammonium chloride as the essential active ingredient.

3. The method of destroying undesirable plants which comprises applying to said plants a toxic quantity of a herbicidal composition comprising an inert carrier and [2-(tert-dodecylmercapto)-ethyl] (2 - hydroxyethyl) dimethylammonium chloride as the essential active ingredient.

References Cited in the file of this patent

UNITED STATES PATENTS

| Number | Name | Date |
|---|---|---|
| 2,086,585 | Taub et al. | July 13, 1937 |
| 2,108,765 | Domagk | Feb. 15, 1938 |
| 2,297,221 | Huttenlocker | Sept. 29, 1942 |
| 2,548,679 | Olin | Apr. 10, 1951 |
| 2,562,011 | Baumgartner | July 24, 1951 |
| 2,580,474 | Sowa | Jan. 1, 1952 |

FOREIGN PATENTS

| Number | Country | Date |
|---|---|---|
| 436,725 | Great Britain | Oct. 14, 1935 |